(12) United States Patent
Sadasivan et al.

(10) Patent No.: US 7,160,573 B2
(45) Date of Patent: *Jan. 9, 2007

(54) METHOD OF MANUFACTURING A COLOR FILTER

(75) Inventors: Sridhar Sadasivan, Rochester, NY (US); Ramesh Jagannathan, Rochester, NY (US); Seshadri Jagannathan, Pittsford, NY (US); Rajesh Mehta, Rochester, NY (US); David J. Nelson, Rochester, NY (US); Glen C. Irvin, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 679 days.

This patent is subject to a terminal disclaimer.

(21) Appl. No.: 10/460,814

(22) Filed: Jun. 12, 2003

(65) Prior Publication Data

US 2004/0109939 A1    Jun. 10, 2004

Related U.S. Application Data

(63) Continuation-in-part of application No. 10/313,587, filed on Dec. 6, 2002, now Pat. No. 6,790,483.

(51) Int. Cl.
*B05D 5/06* (2006.01)

(52) U.S. Cl. .................. 427/162; 427/468; 427/475; 427/485; 427/282

(58) Field of Classification Search ............. 427/162, 427/468, 475, 485, 282
See application file for complete search history.

(56) References Cited

U.S. PATENT DOCUMENTS

| 4,013,502 A | 3/1977 | Staples et al. |
| 4,031,268 A * | 6/1977 | Fairbairn ............... 427/448 |
| 4,143,297 A * | 3/1979 | Fischer .................. 313/502 |
| 4,218,532 A | 8/1980 | Dunkleberger |
| 4,582,731 A | 4/1986 | Smith |
| 4,734,227 A | 3/1988 | Smith |
| 4,737,384 A | 4/1988 | Murthy et al. |
| 4,777,117 A * | 10/1988 | Murata et al. ............ 430/293 |

(Continued)

FOREIGN PATENT DOCUMENTS

JP    2002313750    * 10/2002

OTHER PUBLICATIONS

English translation for JP 2002313750; 13 pages.*

(Continued)

*Primary Examiner*—Alain L. Bashore
(74) *Attorney, Agent, or Firm*—William R. Zimmerli (57) ABSTRACT

A method of forming a color filter is provided. The method includes providing a mixture of a color filter material and a compressed fluid; providing at least a partially controlled environment for retaining a substrate, the at least partially controlled environment being in fluid communication with the mixture of the color filter material and the compressed fluid; providing a shadow mask in close proximity to the substrate retained in the at least partially controlled environment; and chargably releasing the mixture of the color filter material and the compressed fluid into the at least partially controlled environment, wherein the color filter material becomes free of the compressed fluid prior to contacting the substrate at locations defined by the shadow mask thereby forming a patterned deposition on the substrate.

8 Claims, 6 Drawing Sheets

U.S. PATENT DOCUMENTS

| | | |
|---|---|---|
| 5,545,307 A | 8/1996 | Doss et al. |
| 5,874,188 A | 2/1999 | Roberts et al. |
| 6,116,718 A | 9/2000 | Peeters et al. |
| 6,245,393 B1 | 6/2001 | Thompson et al. |
| 6,537,607 B1 * | 3/2003 | Swanson .................... 427/66 |
| 2002/0118245 A1 | 8/2002 | Jagannathan |

OTHER PUBLICATIONS

Ivor Brodie and Julius J. Murray, " The Physics of Micro/Nano-Fabrication" *Plenum Press*, New York, 1992.

* cited by examiner

METHOD OF MANUFACTURING A COLOR FILTER

CROSS REFERENCE TO RELATED APPLICATIONS

This application is a continuation-in-part of U.S. patent application Ser. No. 10/313,587, filed Dec. 6, 2002 now U.S. Pat. No 6,790,483 and assigned to the Eastman Kodak Company.

This application is related to Ser. No. 10/313,549 filed Dec. 6, 2002; and assigned to the Eastman Kodak Company.

FIELD OF THE INVENTION

This invention relates generally to deposition from compressed fluids and, more particularly, to patterned deposition from compressed fluids onto suitable substrates with the use of masks.

BACKGROUND OF THE INVENTION

Color filters and the methods used to manufacture color filters are known. Color filter producing methods include techniques that deposit color filter material onto a prepatterned substrate. These techniques include, for example, vapor deposition, spin-coating, and thermal deposition (see, for example, U.S. Pat. No. 5,874,188, issued to Roberts et al., on Feb. 23, 1999).

Other methods of manufacturing color filters involve evaporating the color filter material, using heat or ion bombardment, and then depositing the evaporated color filter material onto a substrate using a condensation process or a chemical reaction. In these manufacturing processes, the color filter material must to be thermally stable or have a thermally stable precursor that generates the color filter material on the substrate (when a chemical reaction process is used). As is known in the art, these processes are not adapted to generate patterned layers of thermally unstable color filter materials.

Typically, color filters are formed as a continuous film or and array of pixels. They can include a single color material or multiple color materials (for example, combinations of red, green, and blue; or cyan, magenta, yellow, and black). When multiple color materials are used, the color filter is typically formed using pixels in a two dimensional array. Conventional color filter materials are typically composed of organic and organometallic pigments, semiconductors, ceramics, and combinations thereof.

Inkjet printing systems are commonly used to create high-resolution patterns on a substrate. In a typical inkjet printing system, ink droplets are ejected from a nozzle towards a recording element or medium to produce an image on the medium.

When used to create a color filter, the ink composition, or recording liquid, ejected by the inkjet printing system comprises a color filter material, such as a dye or pigment or polymer, and a large amount of solvent, or carrier liquid. Typically, the solvent is made up of water, an organic material such as a monohydric alcohol, a polyhydric alcohol or mixtures thereof. The ink composition usually includes additives designed to preserve pixel integrity after the droplet is deposited on the recording element, or substrate, due to the high concentrations of solvents in conventional color filter ink formulations. Additive materials may include surfactants, humectants, biocides, rheology modifiers, sequestrants, pH adjusters, and penetrants, etc.

U.S. Pat. No. 6,245,393 B1, issued to Thompson et al., on Jun. 12, 2001, discloses a method of making a multicolor display device. The device includes a transparent substrate and a fluorescent dye deposited in a dye layer on the substrate using inkjet printing. This method is disadvantaged because the ink compositions, which include the color filter material, have high solvent concentrations which enables the ejection of the ink composition using conventional inkjet printers. As such, processing steps devoted to the removal of the solvent(s) are required. Additionally, the color filter materials used will not always dissolve or solubilize in commonly available solvents. This can necessitate the use of exotic solvents that are environmentally harmful and/or expensive.

Technologies that use supercritical fluid solvents to create thin films are also known. For example, R. D. Smith in U.S. Pat. No. 4,734,227, discloses a method of depositing solid films or creating fine powders through the dissolution of a solid material into a supercritical fluid solution and then rapidly expanding the solution to create particles of the marking material in the form of fine powders or long thin fibers, which may be used to make films. There is a problem with this method in that the free-jet expansion of the supercritical fluid solution results in a non-collimated/defocused spray that cannot be used to create high resolution patterns on a receiver. Furthermore, Smith does not teach the use of a mask to create high resolution patterns on a receiver.

Other technologies that deposit a material onto a receiver using gaseous propellants are known. For example, Peeters et al., in U.S. Pat. No. 6,116,718, discloses a print head for use in a marking apparatus in which a propellant gas is passed through a channel, the marking material is introduced controllably into the propellant stream to form a ballistic aerosol for propelling non-colloidal, solid or semi-solid particulate or a liquid, toward a receiver with sufficient kinetic energy to fuse the marking material to the receiver. There is a problem with this technology in that the marking material and propellant stream are two different entities and the propellant is used to impart kinetic energy to the marking material. When the marking material is added into the propellant stream in the channel, a non-colloidal ballistic aerosol is formed prior to exiting the print head. This non-colloidal ballistic aerosol, which is a combination of the marking material and the propellant, is not thermodynamically stable/metastable. As such, the marking material is prone to settling in the propellant stream which, in turn, can cause marking material agglomeration, leading to discharge device obstruction and poor control over marking material deposition.

Huck et al., in WO 02/45868 A2, disclose a method of creating a pattern on a surface of a wafer using compressed carbon dioxide. The method includes dissolving or suspending a material in a solvent phase containing compressed carbon dioxide, and depositing the solution or suspension onto the surface of the wafer, the evaporation of the solvent phase leaving a patterned deposit of the material. The wafer is prepatterned using lithography to provide the wafer with hydrophilic and hydrophobic areas. After deposition of the solution (or suspension) onto the wafer surface followed by the evaporation of the solvent phase, the material (a polymer) sticks to one of the hydrophobic and hydrophilic areas. The solution (or suspension) is deposited on the wafer surface either in the form of liquid drops or a feathered spray.

This method is disadvantaged because deposition using a feathered spray requires that the wafer surface be prepatterned prior to deposition. Hence, direct patterning of the wafer surface is not possible because of the diverging profile (feathered) of the spray. Additionally, a wafer surface that has not been prepatterned cannot be patterned using this method. This method also requires time for drying so that the solvent phase of the liquid drops (or feathered spray) can evaporate. During the time associated with solvent phase evaporation, the solvent and the material can diffuse (for example, into the surface or along the surface) degrading the desired pattern Further, those skilled in the art will appreciate that it is common to use a mask technique for patterned deposition. Typically, the mask employed for patterning on a planar substrate surface is a photoresist material. However, when the surface is nonplanar, difficulties can be encountered in depositing and cleaning off the photoresist material, necessitating the use of shadow masks or stencils. For example, U.S. Pat. No. 4,218,532 titled "Photolithographic Technique For Depositing Thin Films," issued Aug. 19, 1980 to Dunkleberger discloses a method for patterned deposition of thin films of metals, such as lead alloys, by vacuum evaporation onto a substrate through openings in a mask fabricated with a predetermined pattern. A shortcoming of this development is that it cannot be used for the patterned deposition of thermally unstable color filter materials since these are not suitable for vacuum evaporation.

In U.S. Pat. No. 4,013,502 titled "Stencil Process For High Resolution Pattern Replication," issued Mar. 22, 1977 to Staples, a process for obtaining high-resolution pattern replication using stencils is disclosed. The stencil in Staples is a mask effecting molecular beam deposition of thin films onto a substrate through openings in the stencil. In this deposition process, the molecular beam source is an electron-beam evaporator. Much like the Dunkleberger development, a shortcoming of Staples' technology is that it cannot be used for patterned deposition of thermally unstable materials that are not suitable for evaporation using an electron beam evaporator.

Furthermore, it is well known that patterned deposition of thermally unstable materials on substrates may be achieved by liquid phase processes such as electroplating, electrophoresis, sedimentation, or spin coating but these processes are system specific. For example, in the case of electroplating, it is necessary that an electrochemically active solution of the functional material precursor is available. In the case of sedimentation and spin coating, a stable colloidal dispersion is necessary. In the case of electrophoresis, it is also necessary that the stable colloidal dispersion be charged. Microfabrication of multi-layer structures usually requires multiple stages, necessitating the complete removal of residual liquids/solvents at the end of every stage, which can be very energy, time, and cost intensive. Further, many of these liquid-based processes require the use of non-aqueous liquids/solvents, which are hazardous to health and the disposal of which can be prohibitively expensive. For example, in U.S. Pat. No. 5,545,307 titled "Process For Patterned Electroplating," issued Aug. 13, 1996 to Doss et al., a process is disclosed for patterned electroplating of metals onto a substrate 14 through a mask. The Doss et al. process, however, has at least two major shortcomings. First, it is only applicable to materials that have electrochemically active precursors. Second, it uses an aqueous electroplating bath for the process that requires the coated substrate be cleaned and then dried at the end of the coating process.

Moreover, it is well known that to eliminate the need for potentially harmful solvents that need drying, it is possible to use environmental and health-benign supercritical fluids such as carbon dioxide as solvents. For example, in U.S. Pat. No. 4,737,384 titled "Deposition Of Thin Films Using Supercritical Fluids," issued Apr. 12, 1988 to Murthy et al., a process is disclosed for depositing thin films of materials that are soluble in supercritical fluids onto a substrate. Murthy et al. include the steps of exposing a substrate at supercritical temperatures and pressures to a solution comprising a metal or polymer dissolved in water or a non-polar organic solvent. The metal or polymer is substantially insoluble in the solvent under sub-critical conditions and is substantially soluble in the solvent under supercritical conditions. Reducing the pressure alone, or temperature and pressure together, to sub-critical values cause the deposition of a thin coating of the metal or polymer onto the substrate. Nonetheless, a shortcoming of the process of Murthy et al. is its limited applicability to materials that can be dissolved in compressed fluids, severely limiting the choice of materials that can be deposited on a substrate using this technology. Another shortcoming of the process of Murthy et al. is that it does not teach a process for the patterned deposition of functional materials.

In U.S. Pat. No. 4,582,731 titled "Supercritical Fluid Molecular Spray Film Deposition and Powder Formation," issued Apr. 15, 1986 to Smith, and U.S. Pat. No. 4,734,227 titled "Method Of Making Supercritical Fluid Molecular Spray Films, Powder And Fibers," issued Mar. 29, 1988 to Smith, independent processes are disclosed for producing solid films on a substrate by dissolving a solid material into supercritical fluid solution at an elevated pressure. In both cases, the supercritical fluid solution is then rapidly expanded in a region of relatively low pressure through a heated nozzle having a relatively short orifice. Both of the aforementioned Smith processes have similar shortcomings to those indicated above, i.e., they are only applicable to materials that are soluble in compressed fluids and do not teach a process for patterned deposition. There is another problem with this method in that the free-jet expansion of the supercritical fluid solution results in a non-collimated/defocused spray that cannot be used to create high-resolution patterns directly on a receiver. Further, defocusing leads to losses of the marking material Therefore, a need persists in the art for a patterned deposition method for creating a color filter that permits the patterned deposition of thermally unstable/labile color filter materials and that reduces or eliminates the use of expensive and both environmentally and human health-hazardous solvents. A further need exists for a patterned deposition method for creating color filter that eliminates the need for post-deposition drying for solvent-elimination. Moreover, there is an additional need for a patterned deposition technique that is applicable for a wide range of color filter materials and that is not limited by specific properties of the color filter materials.

SUMMARY OF THE INVENTION

According to one aspect of the invention, a method of forming a color filter includes providing a mixture of a color filter material and a compressed fluid; providing at least a partially controlled environment for retaining a substrate, the at least partially controlled environment being in fluid communication with the mixture of the color filter material and the compressed fluid; providing a shadow mask in close proximity to the substrate retained in the at least partially controlled environment; and chargably releasing the mixture of the color filter material and the compressed fluid into the at least partially controlled environment, wherein the color filter material becomes free of the compressed fluid prior to contacting the substrate at locations defined by the shadow mask thereby forming a patterned deposition on the substrate.

The color filter material can be a first color filter material and the shadow mask can be a first shadow mask. When this occurs, the method can also include providing a mixture of a second color filter material and a compressed fluid; providing a second shadow mask in close proximity to the substrate retained in the at least partially controlled environment; and chargably releasing the mixture of the second color filter material and the compressed fluid into the at least partially controlled environment, wherein the second color filter material becomes free of the compressed fluid prior to contacting the substrate at locations defined by the second shadow mask.

Alternatively, the color filter material can be a first color filter material. When this occurs, the method can also include providing a mixture of a second color filter material and a compressed fluid; indexing the shadow mask; and chargably releasing the mixture of the second color filter material and the compressed fluid into the at least partially controlled environment, wherein the second color filter material becomes free of the compressed fluid prior to contacting the substrate at locations defined by the indexed shadow mask.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

Figure 1:
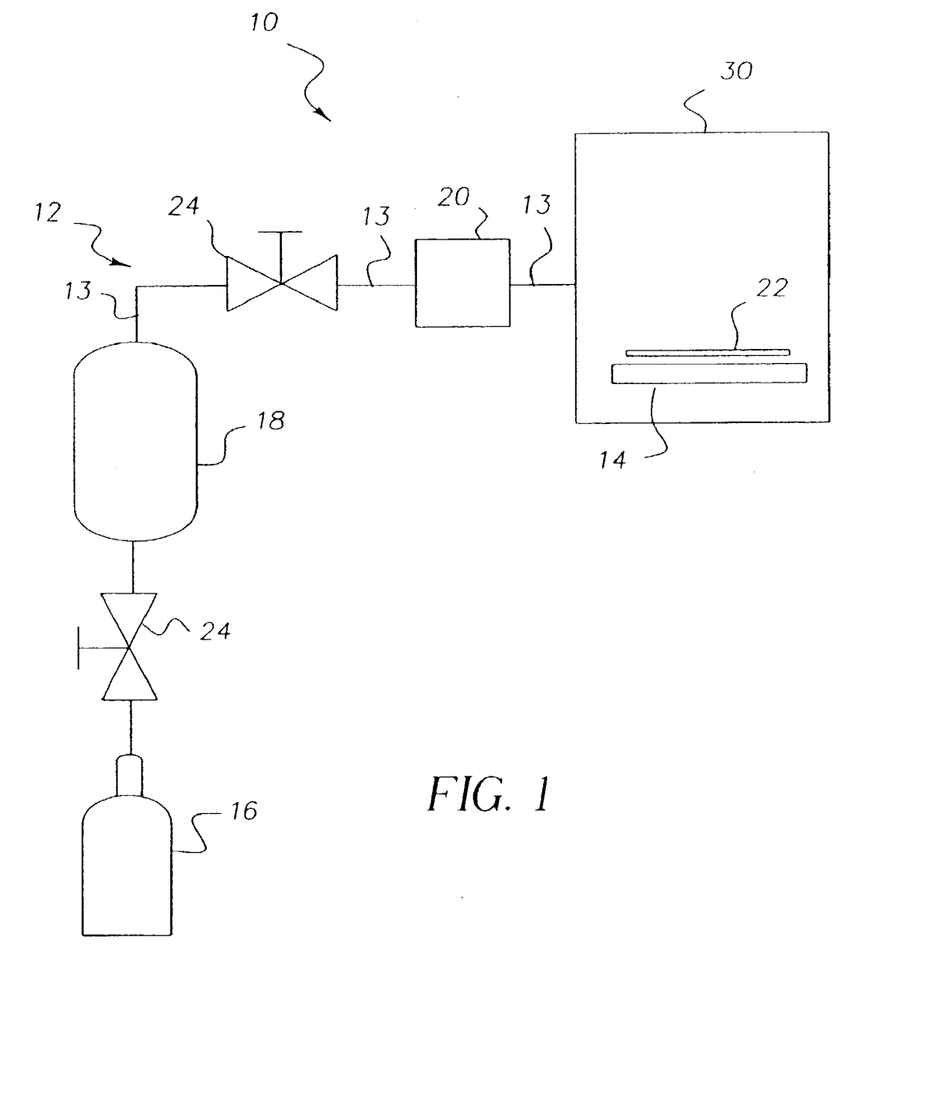
FIG. 1 is a schematic view of a preferred embodiment made in accordance with the present invention.

Turning now to the drawings, and more particularly to FIG. 1, system 10, broadly defined, for producing patterned deposition from compressed fluids includes a delivery system 12, a deposition chamber, or alternatively controlled environment, 30, and a substrate 14 retained in the deposition chamber, or alternatively, controlled environment 30. Controlled environment 30 is more typically a deposition chamber, as described in detail below. A typical delivery system 12 contemplated by the invention is one disclosed, for instance, in commonly assigned U.S. Pat. No. 6,471,327 B2, issued to Jagannathan et al., on Oct. 29, 2002, and titled "Apparatus And Method Of Delivering A Focused Beam Of A Thermodynamically Stable/Metastable Mixture Of A Function Material In A Dense Fluid Onto A Receiver," hereby incorporated herein by reference. Each of the disclosed delivery systems is capable of delivering a precipitate color filter material (as described below) and can be used in the invention.

Referring to FIG. 1, delivery system 12, capable of delivering fluids along fluid delivery path 13 in a compressed state, generally includes a source 16 of compressed fluid, a formulation reservoir 18 for containing a formulation material, a discharge assembly 20, each being described in detail in the above U.S. patent applications. Delivery system 12 serves several important functions in the invention. It enables the dissolution and/or dispersal of a selected material into a compressed fluid with density greater than 0.1 g/cc$^3$. Further, a solution and/or dispersion of an appropriate color filter material or combination of color filter materials in the chosen compressed fluid is produced in delivery system 12. Moreover, delivery system 12 delivers the color filter materials as a beam or spray into a deposition chamber 30 in a controlled manner. In this context, the chosen materials taken to a compressed fluid state with a density greater than 0.1 g/cc$^3$ are gases at ambient pressure and temperature. Ambient conditions are preferably defined as temperature in the range from −100 to +100° C., and pressure in the range from $1\times10^{-8}$–100 atm for this application.

Figure 2:
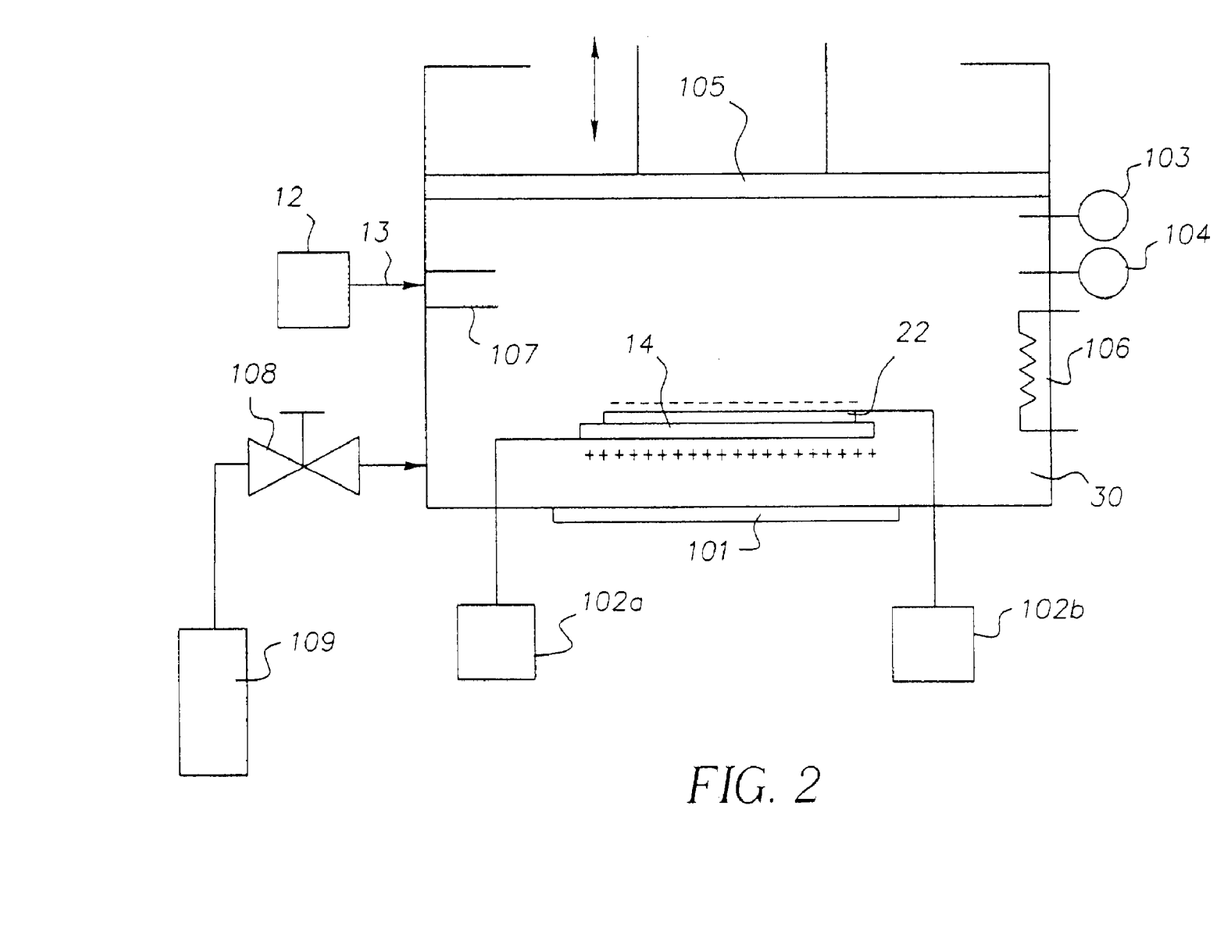
FIG. 2 is enlarged schematic view of a controlled environment in one embodiment of the invention.

As depicted in FIG. 1, controlled environment 30, such as a deposition chamber, is arranged proximate to delivery system 12. Controlled environment 30 is positioned at one end of the fluid delivery path 13 and adjacent the discharge assembly 20 of delivery system 12. As illustrated in FIG. 2, substrate 14 to be patterned with deposition material and is suitably arranged within deposition chamber 30. In close proximity to substrate 14, a mask 22 is preferably used to control the location of the deposited color filter material on the substrate 14.

Figure 3:
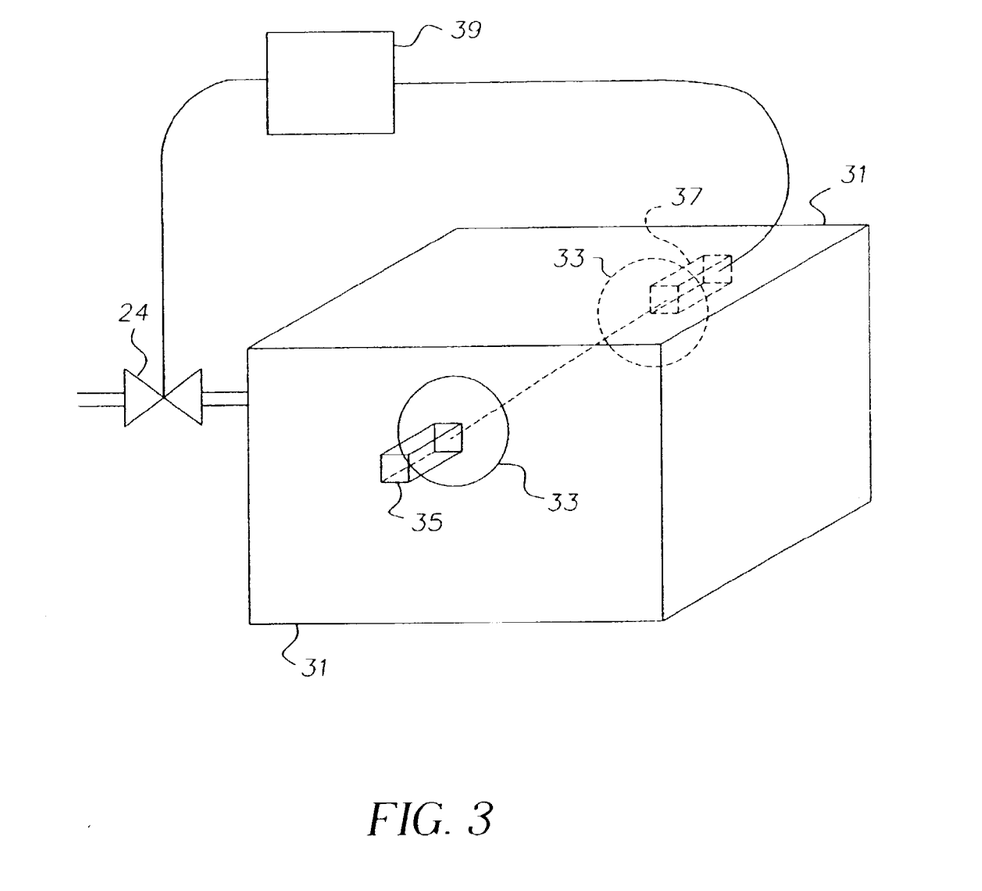
FIG. 3 is a schematic view of an alternative embodiment of an enclosure of the invention

Referring to FIG. 3, in many applications, it is desirable to maintain an exact concentration of color filter material within the controlled enclosure 31. Whilst open loop systems relying on valve opening times can be used, for greater precision and reliability it is desirable to use a system such as the one illustrated in FIG. 3. According to FIG. 3, enclosure 31 (applies to enclosures of FIGS. 2, 5 and 6) is fitted with at least one viewing window or port 33. Viewing window 33 can be used alone to provide a visual indication of the conditions inside the enclosure 31. On the other hand, a viewing window 33 is also required to facilitate the use of optical emitters 35 and optical detectors 37 for the purpose of a more accurate assessment of the concentration of color filter material inside the enclosure 31. The optical emitter 35 emits a beam of light that travels across the inside of the enclosure 31 and is detected by optical detector 37. This optical detector 37 sends an electrical signal to the microprocessor 39 in proportion to the amount of light received (which is a function of the amount of color filter material inside the controlled enclosure 31). This information can be used in many ways, most simply as a check of the process, but also as an input to a closed loop control of the input valve 24. For example, if the concentration in the controlled enclosure 31 is low, the valve 24 is opened allowing more color filter material to enter the controlled enclosure 31. This method relies on the cleanliness of the viewing windows 33 to be effective, and therefore either by routine maintenance, calibration, or the application of a like charge as the particles to the viewing windows 33, the viewing windows 33 themselves must be kept free of debris. Skilled artisans will appreciate that there are many variations and other detection methods that could be applied to a closed loop concentration monitoring and control method described above. For example, in an optical detection scheme, the optical emitter 35 and optical detector 37 could be on the same side of the controlled enclosure 31 relying on a reflective surface on the opposite side to reflect the beam. The scope is not limited to optical detection, any method that provides an indication of the amount of color filter material such as electrical properties, physical properties, or chemical properties could be used.

Referring back to FIG. 1, a compressed fluid carrier contained in the source 16 of compressed fluid is any material that dissolves/solubilizes/disperses a color filter material. Source 16 of compressed fluids, containing compressed fluid delivers the compressed fluid carrier at predetermined conditions of pressure, temperature, and flow rate as a compressed fluid. Compressed fluids are defined in the context of this application as those fluids that have a density of greater than 0.1 grams per cubic centimeter in the defined range of temperature and pressure of the formulation reservoir, and are gases at ambient temperature and pressure. Materials in their compressed fluid state that exist as gases at ambient conditions find application here because of their unique ability to solubilize and/or disperse color filter materials of interest in the compressed fluid state, and precipitate the color filter material under ambient conditions.

Fluids of interest that may be used to transport the color filter material include but are not limited to carbon dioxide, nitrous oxide, ammonia, xenon, ethane, ethylene, propane, propylene, butane, isobutane, chlorotrifluoromethane, monofluoromethane, sulphur hexafluoride, and mixtures thereof. Due to environmental compatibility, low toxicity, low cost, wide availability, and non-flammability, carbon dioxide is generally preferred.

Referring again to FIG. 1, formulation reservoir 18 is utilized to dissolve and/or disperse color filter materials in compressed liquids or compressed fluids with or without cosolvents and/or dispersants and/or surfactants, at desired formulation conditions of temperature, pressure, volume, and concentration. The formulation may include additives to modify surface tension for charging and wetting viscosity through the use of rheology modifiers and/or thickeners, stabilizers, binders, and dopants.

In addition, the formulation reservoir 18 can include a source that electrically charges the material particles prior to the material being ejected from the discharge assembly 20. Charging the particles is an important step in many of the preferred embodiments. Alternatively, the color filter materials can also be chosen such that the color filter material stream becomes charged as it is ejected from the discharge assembly 20 and does not need additional charging. Additionally, additives that can promote charging of the color filter materials can also be chosen such that the color filter material stream becomes charged as it is ejected from the discharge assembly 20. Such additives may include surfactants such as those disclosed in U.S. patent application Ser. No. 10/033,458 filed Dec. 27, 2001, titled “A Compressed Fluid Formulation” by Glen C. Irvin, Jr., et al.

Further, formulation reservoir 18 can be made out of any suitable materials that can withstand the formulation conditions. An operating range from 0.001 atmospheres ($1.013\times10^2$ Pa) to 1000 atmospheres ($1.013\times10^8$ Pa) in pressure and from −25° Centigrade to 1000° Centigrade is preferred. Typically, the preferred materials of construction include various grades of high pressure stainless steel. However, the material of choice is determined by temperature and pressure range of operation.

Formulation reservoir 18 should be precisely controlled with respect to the operating conditions, i.e., pressure, temperature, and volume. The solubility/dispersability of color filter materials depends upon the conditions within the formulation reservoir 18 and even small changes in the operating conditions within the formulation reservoir 18 can have undesired effects on color filter material solubility/dispersability.

Any suitable surfactant and dispersant material that is capable of solubilizing/dispersing the color filter materials in the compressed liquid for the required application can be used in this method. Such materials include but are not limited to fluorinated polymers such as perfluoropolyether and silane and siloxane compounds.

Referring to FIGS. 1 and 4, delivery system 12 is shown in fluid communication through orifices/nozzles 28 with enclosed, controlled environment 30 that contains substrate 14 and mask 22. According to FIG. 1, valve 24 may be designed to actuate with a specific frequency or for a fixed time period so as to permit the controlled release of formulation from formulation reservoir 18 into enclosed environment 30 via orifices/nozzles 28. According to FIG. 4, the controlled release of color filter material 40 into enclosed environment 30 results in the evaporation of the compressed fluid 41 and the precipitation and/or aggregation of the dissolved and/or dispersed color filter material 40. The precipitated/aggregated color filter material may be allowed to gravity-settle or may be settled using an electric, electrostatic, electromagnetic, or magnetic assist. Mask 22 in close proximity to substrate 14 results in the patterned deposition of color filter material 40 on the substrate 14.

Substrate 14 may be any solid including an organic, an inorganic, a metallo-organic, a metallic, an alloy, a ceramic, a synthetic and/or natural polymeric, a gel, a glass, and a composite material. Substrate 14 may be porous or non-porous. Additionally, the substrate 14 can have more than one layer. Additionally, the substrate 14 may be flexible or rigid.

As best illustrated in FIGS. 2 and 4, mask 22 may be physical (separate) or integral. The purpose of the mask 22 is to provide a pattern for the deposition of functional solute material. Those skilled in the art will appreciate that mask design and manufacture is well established. Physical masks require direct contact between mask 22 and substrate 14. Their advantage is that they are relatively inexpensive and can be re-used for multiple substrates 14. However, if the substrate 14 is delicate, the physical contact may damage the substrate 14. Precise alignment is also difficult. Integral masks 22 are structures formed on the substrate 14 prior to coating/deposition. Alignment and spacing is easier because the mask 22 is a part of the substrate 14. However, because of the potential need to remove the mask 22 after deposition, a subsequent etching step may be necessary, potentially making this more expensive and time-consuming.

Referring to FIG. 4, nozzle 28 directs the flow of the color filter material 40 from formulation reservoir 18 via delivery system 12 into enclosed environment 30. Nozzle 28 is also used to attenuate the final velocity with which the color filter material 40 enters the enclosed environment 30. In our preferred application, it is desirable to rapidly spread the stream of precipitated color filter material 40 using a divergent nozzle geometry. Skilled artisans will however appreciate that nozzle geometry can vary depending on a particular application, as described in U.S. Patent Application Publication No. 2002/011842A1, incorporate herein by reference.

Operation

Operation of system 10 will now be described. FIG. 4 is a diagram schematically representing the operation of delivery system 10 and should not be considered as limiting the scope of the invention in any manner. The description below uses a single nozzle 28 although multiple nozzles and/or multiple nozzle shapes and/or multiple delivery devices and shapes are within the contemplation of the invention. (See for instance other nozzle examples disclosed in U.S. Pat. No. 6,471,327 B2, issued to Jagannathan et al., on Oct. 29, 2002).

Figure 4:
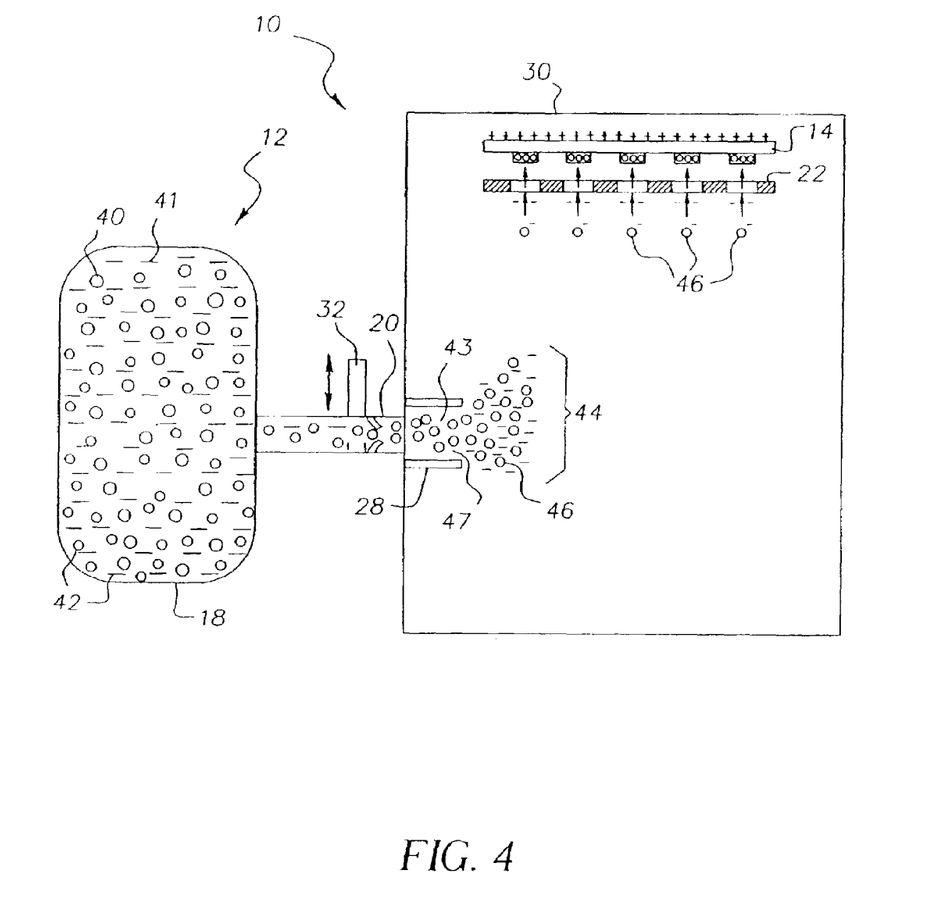
FIG. 4 is a diagram schematically representing the operation of the present invention.

Referring to FIG. 4, a formulation 42 of color filter material 40 in a compressed liquid 41 is prepared in the formulation reservoir 18 of the invention. Color filter material 40, which may be any material of interest in solid or liquid phase, can be dispersed (as shown in FIG. 4) and/or dissolved in a compressed fluid 41 making a mixture or formulation 42. Color filter material 40 may have various shapes and sizes depending on the type of the color filter material 40 used in the formulation.

According to FIG. 4, the compressed fluid (for example, a supercritical fluid, a compressed gas, and/or a compressed liquid) 41 forms a continuous phase and color filter material 40 forms a dispersed and/or dissolved single phase. The formulation 42 (i.e., the color filter material 40 and the compressed fluid 41) is maintained at a suitable temperature and a suitable pressure for the color filter material 40 and the compressed fluid 41 used in a particular application. The shutter 32 is actuated to enable the ejection of a controlled quantity of the formulation 42.

With reference to FIGS. 1 and 4, color filter material 40 is controllably introduced into the formulation reservoir 18. The compressed fluid 41 is also controllably introduced into the formulation reservoir 18. The contents of the formulation reservoir 18 are suitably mixed using a mixing device (not shown) to ensure intimate contact between the color filter material 40 and compressed fluid 41. As the mixing process proceeds, color filter material 40 is dissolved and/or dispersed within the compressed fluid 41. The process of dissolution/dispersion, including the amount of color filter material 40 and the rate at which the mixing proceeds, depends upon the color filter material 40 itself, the particle size and particle size distribution of the color filter material 40 (if the color filter material 40 is a solid), the compressed fluid 41 used, the temperature, and the pressure within the formulation reservoir 18. When the mixing process is complete, the mixture or formulation 42 of color filter material and compressed fluid is thermodynamically stable/metastable in that the color filter material is dissolved or dispersed within the compressed fluid in such a fashion as to be indefinitely contained in the same state as long as the temperature and pressure within the formulation reservoir 18 are maintained constant or in the same state for the period of the efficient operation of the process (metastable). This thermodynamically stable state is distinguished from other physical mixtures in that there is no settling, precipitation, and/or agglomeration of color filter material particles within the formulation reservoir 18 unless the thermodynamic conditions of temperature and pressure within the formulation reservoir 18 are changed. As such, the color filter material 40 and compressed fluid 41 mixtures or formulations 42 of the present invention are said to be thermodynamically stable/metastable.

The color filter material 40 can be a solid or a liquid. Additionally, the color filter material 40 can be an organic molecule, a polymer molecule, a metallo-organic molecule, an inorganic molecule, an organic nanoparticle, a polymer nanoparticle, a metallo-organic nanoparticle, an inorganic nanoparticle, an organic microparticle, a polymer microparticle, a metallo-organic microparticle, an inorganic microparticle, and/or composites of these materials, etc.

After suitable mixing with the compressed fluid 41 within the formulation reservoir 18, the color filter material 40 is uniformly distributed within a thermodynamically stable/metastable mixture, that can be a solution or a dispersion, with the compressed fluid 41. This thermodynamically stable/metastable mixture or formulation 42 is controllably released from the formulation reservoir 18 through the discharge assembly 20.

Referring again to FIG. 4, during the discharge process, the color filter material 40 is precipitated from the compressed fluid 41 as the temperature and/or pressure conditions change. The precipitated color filter material 44 is ejected into the deposition chamber or controlled environment 30 by the discharge assembly 20. The particle size of the color filter material 40 ejected into the chamber 30 and subsequently deposited on the substrate 14 is typically in the range from 1 nanometer to 1000 nanometers. The particle size distribution may be controlled to be more uniform by controlling the formulation (functional solute materials and their concentrations) rate of change of temperature and/or pressure in the discharge assembly 20, and the ambient conditions inside the controlled environment 30.

Although not specifically shown, delivery system 12 (FIG. 4), contemplated by the invention, is also designed to appropriately change the temperature and pressure of the formulation 42 to permit a controlled precipitation and/or aggregation of the color filter material 40 (see for instance U.S. Pat. No. 6,471,327 B2, issued to Jagannathan et al., on Oct. 29, 2002). As the pressure is typically stepped down in stages, the formulation 42 fluid flow is self-energized. Subsequent changes to the conditions of formulation 42, for instance, a change in pressure, a change in temperature, etc., result in the precipitation and/or aggregation of the color filter material 40 coupled with an evaporation of the compressed fluid 41. The resulting precipitated and/or aggregated color filter material 44 deposits on the substrate 14 evenly. According to FIG. 4, evaporation of the compressed fluid 41 can occur in a region located outside of the discharge assembly 20 within deposition chamber 30. Alternatively, evaporation of the compressed fluid 41 can begin within the discharge assembly 20 and continue in the region located outside the discharge assembly 20 but within deposition chamber 30. Alternatively, evaporation can occur within the discharge assembly 20.

According to FIG. 4, a stream 43 of the color filter material 40 and the compressed fluid 41 is formed as the formulation 42 moves through the discharge assembly 20. When the size of the stream 43 of precipitated and/or aggregated color filter material 44 is substantially equal to an exit diameter of the nozzle 28 of the discharge assembly 20, the stream 43 of precipitated and/or aggregated color filter material 44 has been collimated by the nozzle 28. When the size of the stream 43 of precipitated and/or aggregated color filter material 44 is less than the exit diameter of the nozzle 28 of the discharge assembly 20, the stream 43 of precipitated and/or aggregated color filter material 44 has been focused by the nozzle 28. It may be desirable for a deposition chamber input to be a diverging beam to quickly spread the precipitated and/or aggregated color filter material 44 and dissipate its kinetic energy. Such an input is possible without a nozzle 28.

Referring again to FIGS. 2, 4 & 5, substrate 14 resides within deposition chamber 30 such that the stream 43 of precipitated and/or aggregated color filter material stream 44 is deposited onto the substrate 14. The distance of the substrate 14 from the discharge assembly 20 is chosen such that the compressed fluid 41 evaporates prior to reaching the substrate 14. Hence, there is no need for subsequent substrate 14 drying processes. Further, subsequent to the ejection of the formulation 42 from the nozzle 28 and the precipitation of the color filter material 44, additional focusing and/or collimation may be achieved using external devices such as electromagnetic fields, mechanical shields, magnetic lenses, electrostatic lenses, etc. Alternatively, the substrate 14 can be electrically or electrostatically charged such that the position of the color filter material 40 can be controlled.

Referring again to FIG. 4, it is also desirable to control the velocity with which individual particles 46 of color filter material 40 are ejected from the nozzle 28. Since there may be a sizable pressure drop from within the delivery system 10 to the operating environment, the pressure differential converts the potential energy of the delivery system 10 into kinetic energy that propels the color filter material particles 46 onto the substrate 14. The velocity of these particles 46 can be controlled by suitable nozzle design (see discussion above) and by controlling the rate of change of operating pressure and temperature within the system. Further, subsequent to the ejection of the formulation 42 from nozzle 28 and the precipitation of the color filter material 40, additional velocity regulation of the color filter material 40 may be achieved using external devices such as electromagnetic fields, mechanical shields, magnetic lenses, electrostatic lenses, etc. The nozzle design will depend upon the particular application addressed. (See, for instance, U.S. Pat. No. 6,471,327 B2, issued to Jagannathan et al., on Oct. 29, 2002).

Moreover, the temperature of nozzle 28 may also be controlled. Referring to FIG. 4, the temperature of nozzle 28 may be controlled as required by specific applications to ensure that the nozzle opening 47 maintains the desired fluid flow characteristics. Nozzle temperature can be controlled through the nozzle heating module (not shown) using a water jacket, electrical heating techniques, etc. (See, for instance, U.S. Pat. No. 6,471,327 B2, issued to Jagannathan et al., on Oct. 29, 2002). With appropriate nozzle design, the exiting stream temperature can be controlled at a desired value by enveloping the exiting stream with a co-current annular stream of a warm or cool inert gas.

EMBODIMENT I

Referring to FIG. 2, controlled environment 30 is designed for use at extremes of pressure. Incorporated in the controlled environment 30 is a pressure modulator 105. The pressure modulator 105, as shown, resembles a piston. This is for illustration only. Skilled artisans will also appreciate that pressure modulator 105 could also be a pump or a vent used in conjunction with an additional pressure source. An example of an additional pressure source is the source 109 of compressed fluid. This source 109 is modulated with a flow control device or valve 108 to enable color filter material to enter the deposition chamber 30 via a fluid delivery path 13. The pressure inside the deposition chamber 30 is carefully monitored by a pressure sensor 103 and can be set at any pressure less than that of the delivery system 12 (including levels of vacuum) to facilitate precipitation/aggregation. In addition, the deposition chamber 30 is provided with temperature sensor 104 and temperature modulator 106. Temperature modulator 106 is shown as an electric heater but could consist of any of the following (not shown): heater, a water jacket, a refrigeration coil, and a combination of temperature control devices.

Referring to FIGS. 1, 2, and 4, deposition chamber 30 generally serves to hold the substrate 14 and the mask 22 and facilitates the deposition of the precipitated color filter material 44. To enable a more complete and even distribution of the color filter material 40, electric or electrostatic charges can be applied to the substrate 14 and/or mask 22. Through the ejection process in the discharge assembly 20, the particles are known to become charged. If desired, additional charge can be applied to them using a particle charging device 107 (FIG. 2). The color filter material 40, now charged can be attracted or repelled from various surfaces to aid in the deposition process. According to FIG. 2, charging devices 102*a*, 102*b* are provided for both the substrate 14 and mask 22, respectively. For illustrative purposes only, a positive charge (+) is shown on substrate 14 and a negative charge (−) is shown on mask 22. The polarity may be changed to suit the application. A charge equal to that of the color filter material 40 is applied to the mask 22, whereas a charge opposite of that of the color filter material 40 is applied to the substrate 14 to attract the color filter material. Obviously there can be no electrical conduction between the two to maintain the charge differential. This may limit the material selection of one or both, or add the requirement for an additional insulating layer (not shown). In a similar manner, it may be beneficial to create other electric or electrostatic charges on the deposition chamber 30 or on any other mechanical elements within the deposition chamber 30. As shown in FIG. 6, an internal baffle 122 may be used to provide a more even distribution of color filter material 40 within the deposition chamber 200. A charge may be applied to the internal baffling by a baffle charging device 123.

Referring again to FIG. 2, deposition chamber 30 also provides easy access for the insertion and removal of the substrate 14 through access port 101. This process will potentially be automated by mechanical devices which are not shown. Access port 101 of deposition chamber 30 also provides access for the insertion and removal of the mask 22 as well as for the proper placement of the mask 22. Mask alignment relative to the substrate 14 is key to this application and may be manual or preferably, automated. Though it is shown oriented with the substrate 14 facing upwards, this is not a requirement of the invention. When attracting particles electrostatically, it may be advantageous to orient the substrate 14 facing downward. In this manner, no debris from the deposition chamber 30 could inadvertently fall onto the substrate 14.

The controlled environment can be used for post deposition processing of the deposited material on the substrate. Post deposition processing may involve the control of humidity, temperature, atmospheric conditions including pressure, and chemical composition of the atmosphere. As an example, many processes require the curing of the materials to obtain desired functionality at elevated temperature. The thermal control that is already built into the enclosure can be utilized for this purpose. Alternatively, the post processing required can be done outside the enclosure.

It should be appreciated that deposition chamber 30 should also be designed so that there are no dead volumes that may result in the accumulation of precipitated color filter materials 44 and so that it may be easily cleaned. As such, it may be further partitioned into more than one sub-chamber to facilitate the above (not shown). It may also be equipped with suitable mechanical devices to aid the precipitation and deposition of color filter material 40. An example of such a device would be a mechanical agitator.

EMBODIMENT II

Figure 5:
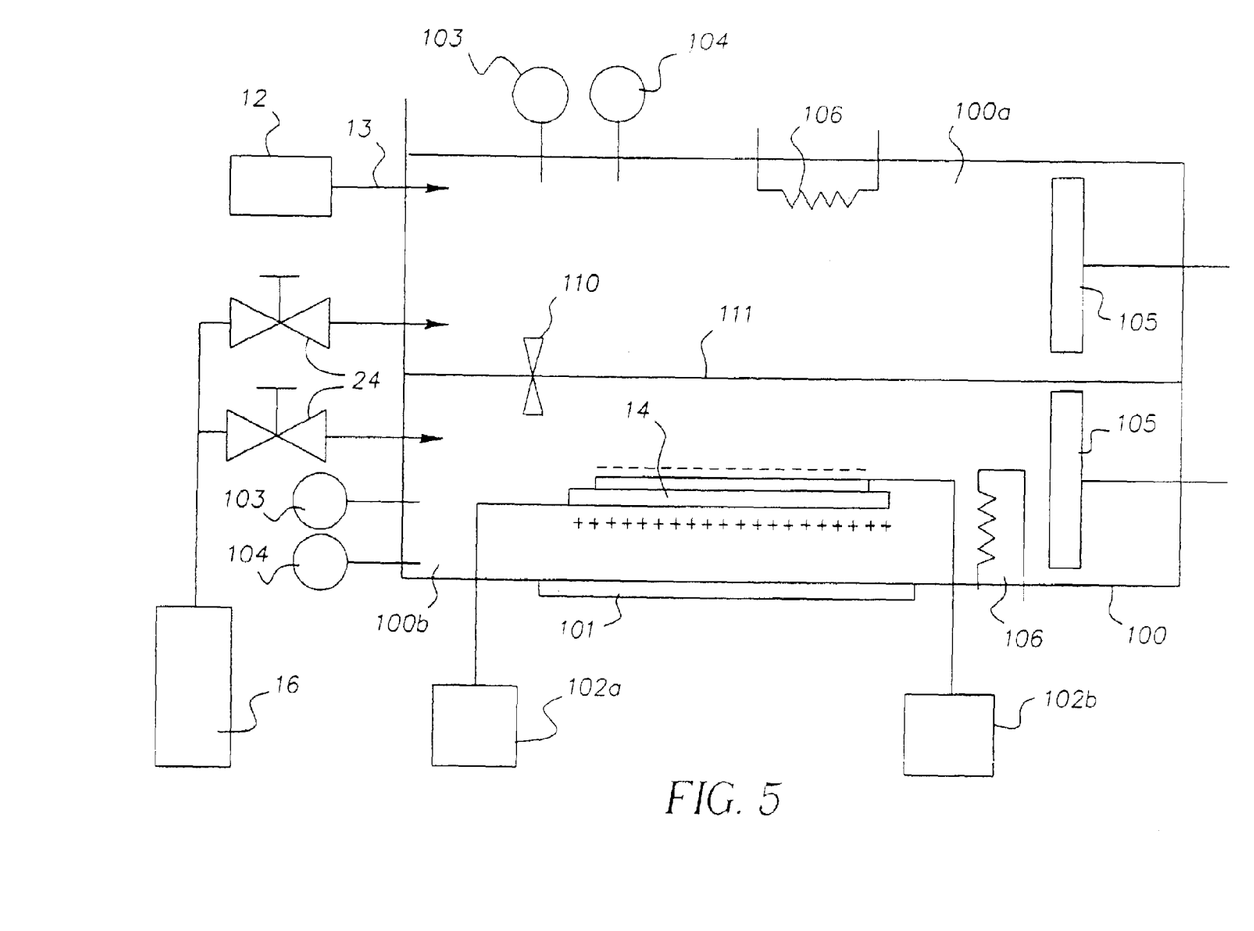
FIG. 5 is a schematic view of an alternative embodiment of a controlled environment or deposition chamber useful in the invention; and, FIG. 6 is a schematic view of an alternative embodiment of another controlled environment or deposition chamber useful in the invention.

Turning now to FIG. 5, another embodiment of deposition chamber 100, contemplated by the invention, is shown. It contains many of the same features previously described in the discussion of FIG. 2, with the addition of a medium 111 which divides the deposition chamber 100 into a preparation sub-chamber 100a and a deposition sub-chamber 100b. The materials in these sub-chambers 100a, 100b are allowed to flow through controllable dual chamber interface valve 110. Each sub-chamber 100a, 100b is configured with independent control of pressure and temperature through the use of pressure sensors 103, temperature sensors 104, pressure modulators 105, and temperature modulators 106. The preparation sub-chamber 100a differs from the formulation reservoir 18 (FIG. 1) in that the color filter material 40 can be (but is not necessarily) precipitated. The addition of a preparation sub-chamber 100a to the system allows for a potentially large volume of prepared deposition material to be ready and maintained at a higher than ambient pressure while still allowing the changing of substrate 14 and deposition material through the access port 101.

EMBODIMENT III

Figure 6:
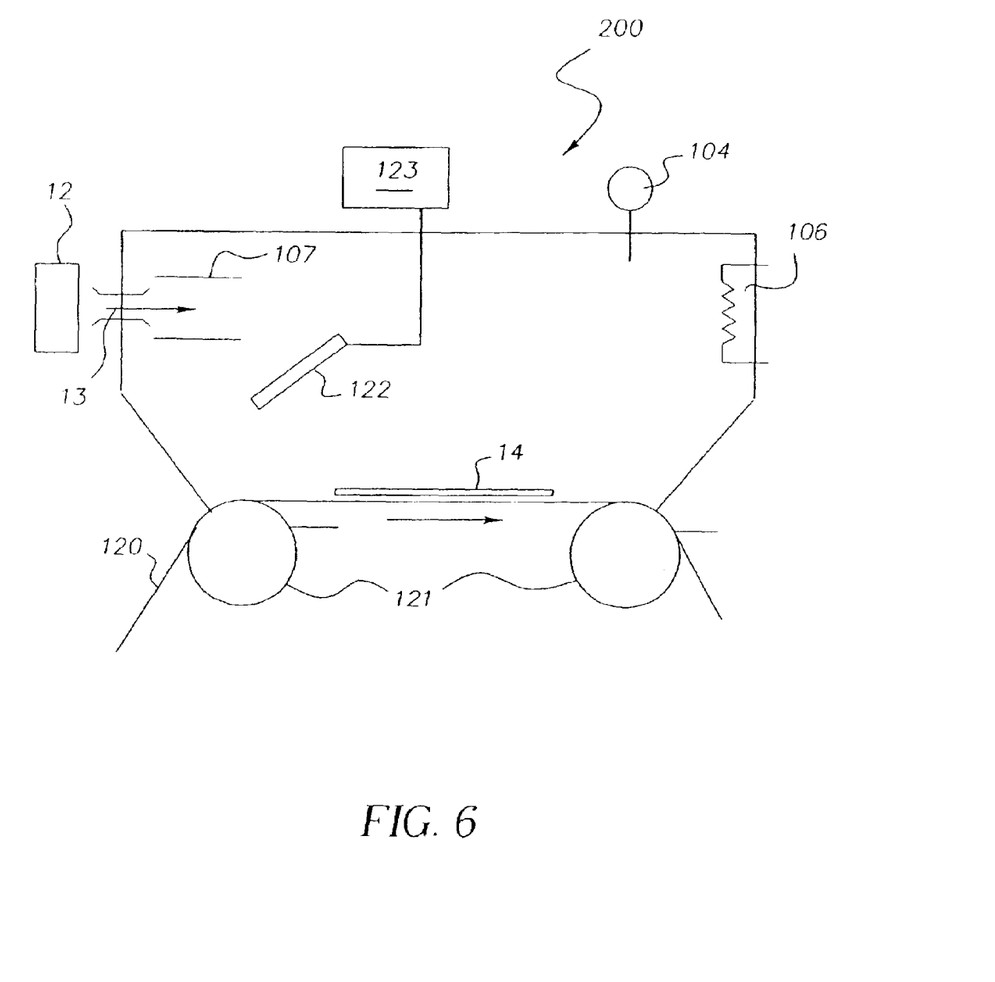

In FIG. 6, a simplified deposition chamber 200 is illustrated. In this embodiment, no provision is made for maintaining a pressure above that of ambient. Many of the other features described in FIGS. 2 and 5 are still possible, but by no longer requiring the deposition chamber 200 to support an elevated pressure, certain additional advantages can be realized. For example, the substrate 14 no longer is required to be contained in deposition chamber 200. This is illustrated in FIG. 6 by showing a moving substrate in the form of a web 120 that is transported by conveyors 121. In such a system, it is possible to perform continuous coating operations. In this case, a separate mask would likely not be used except for the case of a step and repeat process. Rather, a mask integral to the substrate, as previously described, is the preferred method of achieving patterned deposition. Alternatively, a similar approach, illustrated in FIGS. 2 and 5, could be used also without need for access port 101.

Additional aspects of the invention may include multiple deposition chambers 30, 100, or 200, as illustrated in FIGS. 2, 5, and 6, for coating multiple layers onto substrate 14. Alternatively, multiple masks 22 may be used such that a mask with a specific configurational structure of aperture patterns is used and subsequently replaced with another shadow mask of different configurational structure of aperture patterns on the same substrate 14. Multiple masks, indexing of a mask, multiple layers, and multiple material processes are commonly used in the manufacture of displays, therefore details and methods to provide proper registration such as through the use of optical fiducials are well known. The sequential process used for deposition of colored material(s) for display products applications may be interspersed with other processes, including deposition of other material(s) and/or post treatment of deposited material(s), as needed, to create a desired product.

General Architecture of a Color Filter

The general architecture of a color filter made in accordance with the present invention will now be described. The color filter can be a continuous film type or a pixellated array type. Additionally, either type of color filter can include one or a plurality of color filter materials.

Substrate

The substrate used with the invention can be any solid material, including an organic, an inorganic, a metallo-organic, a metallic, an alloy, a ceramic, a synthetic and/or natural polymeric, a gel, a glass, or a composite material. The substrate can also have more than one layer. For example, when the color filter is of the pixellated array type, the substrate can include a pre-patterned photoresist layer containing selected openings over the pixel array. After depositing the color filter material, the pre-patterned photoresist layer can be removed leaving the color filter material(s) in the opening position(s) over the pixel array. The photoresist layer can be created in any known manner.

Materials

The color filter material(s) can be any material delivered to a substrate, to create a pattern on the substrate using deposition, etching, or other processes involving placement of a color filter material on a substrate. The color filter material(s) can be selected from species that are ionic and/or molecular of the types such as organic, inorganic, metallo-organic, polymeric, oligomeric, metallic, alloy, ceramic, a synthetic and/or natural polymer, and a composite material.

For example, color filter materials which are useful in the invention include, but are not limited to, the following: phthalocyanines, such as Pigment Blue 15, nickel phthalocyanine, chloroaluminum phthalocyanine, hydroxy aluminum phthalocyanine, vanadyl phthalocyanine, titanyl phthalocyanine, and titanyl tetrafluorophthalocyanine; isoindolinones, such as Pigment Yellow 110 and Pigment Yellow 173; isoindolines, such as Pigment Yellow 139 and Pigment Yellow 185; benzimidazolones, such as Pigment Yellow 151, Pigment Yellow 154, Pigment Yellow 175, Pigment Yellow 194, Pigment Orange 36, Pigment Orange 62, Pigment Red 175, and Pigment Red 208; quinophthalones, such as Pigment Yellow 138; quinacridones, such as Pigment Red 122, Pigment Red 202, and Pigment Violet 19; perylenes, such as Pigment Red 123, Pigment Red 149, Pigment 179, Pigment Red 224, and Pigment Violet 29; dioxazines, such as Pigment Violet 23; thioindigos, such as Pigment Red 88, and Pigment Violet 38; epindolidiones, such as 2,8-difluoroepindolidione; anthanthrones, such as Pigment Red 168; isoviolanthrones, such as isoviolanthrone; indanthrones, such as Pigment Blue 60; imidazobenzimidazolones, such as Pigment Yellow 192; pyrazoloquinazolones, such as Pigment Orange 67; iketopyrrolopyrroles, such as Pigment Red 254, Irgazin DPP RubinTR, Cromophtal DPP OrangeTR; Chromophtal DPP Flame Red FP (all of Ciba-Geigy); and bisaminoanthrones, such as Pigment Red 177.

The color filter material(s) can be a solid or a liquid. Additionally, the color filter material(s) can be an organic molecule, a polymer molecule, a metallo-organic molecule, an inorganic molecule, an organic nanoparticle, a polymer nanoparticle, a metallo-organic nanoparticle, an inorganic nanoparticle, an organic microparticles, a polymer microparticle, a metallo-organic microparticle, an inorganic microparticle, and/or composites of these materials, etc. Depending on the specific application, it can be desirable to have a polymer-inorganic nanoparticle composite forming the color filter material layer.

The color filter material(s) can be functionalized to dissolve, disperse and/or solubilize the color filter material(s) in the compressed fluid. The functionalization may be performed by attaching fluorocarbons, siloxane, or hydrocarbon functional groups to the color filter material.

After suitable mixing with the compressed fluid, the color filter material is uniformly distributed within a thermodynamically stable/metastable mixture (either a dispersion or a solution) with the compressed fluid (commonly referred to as the formulation). The formulation may also contain a dispersant and or a surfactant to help solubilize and/or disperse the color filter material. The dispersant and/or surfactant can be selected from any group that will have appropriate solubility in the compressed fluid medium as well as have interactions with the color filter material so that the color filter material can be solubilized. Such materials include, but are not limited to, fluorinated polymers such as perfluoropolyether, siloxane compounds, etc.

The formulation is maintained at a temperature and a pressure suitable for the color filter material and the compressed fluid used in a particular application. A preferred range of formulation conditions includes a temperature in the range of 0 to 100° C. and/or a pressure in the range from $1 \times 10^{-2}$ to 400 atm.

It is to be understood that elements not specifically shown or described may take various forms well known to those skilled in the art. Additionally, materials identified as suitable for various facets of the invention, for example, color filter materials, are to be treated as exemplary, and are not intended to limit the scope of the invention in any manner.

PARTS LIST 10 system
12 delivery system
13 fluid delivery path
14 substrate
16 source of compressed fluid
18 formulation reservoir
20 discharge assembly
22 mask
24 closed loop control of the input valve
28 orifices/nozzles
30 deposition chamber or controlled environment
31 enclosure
32 shutter
33 viewing window
35 optical emitter
37 optical detector
39 microprocessor
40 color filter material
41 compressed fluids
42 formulation of color filter material 40
43 stream of color filter material 40
44 precipitated and/or aggregated color filter material
46 color filter material particles
47 nozzle opening
100 alternative embodiment of deposition chamber or controlled environment
100a preparation sub-chamber
100b deposition sub-chamber
101 access port
103 pressure sensor
102a charging device
102b charging device
104 temperature sensor
105 pressure modulator
106 Temperature Modulator
107 particle charging device
108 flow control valve
109 source of compressed fluids
110 interface valve
111 medium
120 web
121 conveyor
122 internal baffle
123 baffle charging device
200 alternative embodiment of deposition chamber or controlled environment

What is claimed is:

1. A method of forming a color filter comprising:
providing a mixture of a color filter material and a compressed fluid;
providing at least a partially controlled environment for retaining a substrate, the at least partially controlled environment being in fluid communication with the mixture of the color filter material and the compressed fluid;
providing a shadow mask in close proximity to the substrate retained in the at least partially controlled environment; and
chargably releasing the mixture of the color filter material and the compressed fluid into the at least partially controlled environment, wherein the color filter material becomes free of the compressed fluid prior to contacting the substrate at locations defined by the shadow mask thereby forming a patterned deposition on the substrate.

2. The method according to claim 1, wherein the color filter material is a first color filter material and the shadow mask is a first shadow mask, the method further comprising:
providing a mixture of a second color filter material and a compressed fluid;
providing a second shadow mask in close proximity to the substrate retained in the at least partially controlled environment; and
chargably releasing the mixture of the second color filter material and the compressed fluid into the at least partially controlled environment, wherein the second color filter material becomes free of the compressed fluid prior to contacting the substrate at locations defined by the second shadow mask.

3. The method according to claim 1, wherein the color filter material is a first color filter material, the method further comprising:
providing a mixture of a second color filter material and a compressed fluid;
indexing the shadow mask; and
chargably releasing the mixture of the second color filter material and the compressed fluid into the at least partially controlled environment, wherein the second color filter material becomes free of the compressed fluid prior to contacting the substrate at locations defined by the indexed shadow mask.

4. The method according to claim 1, wherein the substrate is flexible.

5. The method according to claim 1, wherein the substrate is rigid.

6. The method according to claim 1, wherein the color filter material is selected from the group consisting of phthalocyanines, isoindolinones, isoindolines, benzimidazolones, quinophthalones, quinacridones, dioxazines, thioindigos, epindolidiones, anthanthrones, isoviolanthrones, indanthrones, imidazobenzimidazolones, pyrazoloquinazolone, siketopyrrolopyrroles, and bisaminoanthrones.

7. The method according to claim 1, wherein the color filter is dissolved, dispersed and/or solubilized in the compressed fluid by attaching fluorocarbons, siloxane, or hydrocarbon functional groups to the color filter material.

8. The method according to claim 1, wherein the color filter becomes free of the compressed fluid by being precipitated from the compressed fluid.

* * * * *